(12) United States Patent
Komiya

(10) Patent No.: US 8,609,769 B2
(45) Date of Patent: Dec. 17, 2013

(54) RESIN COMPOSITION AND USE THEREOF

(75) Inventor: Kan Komiya, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 237 days.

(21) Appl. No.: 12/934,626

(22) PCT Filed: Mar. 24, 2009

(86) PCT No.: PCT/JP2009/055740
§ 371 (c)(1),
(2), (4) Date: Sep. 24, 2010

(87) PCT Pub. No.: WO2009/119536
PCT Pub. Date: Oct. 1, 2009

(65) Prior Publication Data
US 2011/0021706 A1    Jan. 27, 2011

(30) Foreign Application Priority Data

Mar. 27, 2008  (JP) ................ 2008-084226

(51) Int. Cl.
*C08L 67/03* (2006.01)
*C08L 77/06* (2006.01)

(52) U.S. Cl.
USPC .......................................... 525/166; 525/179

(58) Field of Classification Search
None
See application file for complete search history.

(56) References Cited

U.S. PATENT DOCUMENTS

| | | | |
|---|---|---|---|
| 4,990,640 | A | 2/1991 | Tsutsui et al. |
| 5,147,931 | A | 9/1992 | Sakuma et al. |
| 5,162,422 | A | 11/1992 | Lausberg et al. |
| 5,321,106 | A | 6/1994 | LaPointe |
| 5,561,092 | A | 10/1996 | Ewen et al. |
| 5,614,457 | A | 3/1997 | Ewen et al. |
| 5,663,249 | A | 9/1997 | Ewen et al. |
| 5,955,547 | A | 9/1999 | Roberts et al. |
| 6,121,395 | A | 9/2000 | Turner |
| 6,939,928 | B1 | 9/2005 | Kawai et al. |
| 7,449,533 | B2 | 11/2008 | Kawai et al. |
| 2006/0047073 | A1 * | 3/2006 | Inoue ........................... 525/191 |
| 2006/0276607 | A1 * | 12/2006 | Ikenaga et al. ............. 526/348.6 |

FOREIGN PATENT DOCUMENTS

| | | |
|---|---|---|
| CN | 88103008 | 12/1988 |
| EP | 0 292 264 | 11/1988 |
| JP | 60-110740 | 6/1985 |
| JP | 60110740 | * 6/1985 |
| JP | 62-158739 | 7/1987 |
| JP | 62-241941 | 10/1987 |
| JP | 01-501950 A | 7/1989 |
| JP | 01-502036 A | 7/1989 |
| JP | 01-311580 A | 12/1989 |
| JP | 02-078687 A | 3/1990 |
| JP | 03-109452 A | 5/1991 |
| JP | 03-179005 A | 8/1991 |
| JP | 03-179006 A | 8/1991 |
| JP | 03-207703 A | 9/1991 |
| JP | 03-207704 A | 9/1991 |
| JP | 04-252264 A | 9/1992 |
| JP | 7-082477 | 3/1995 |
| JP | 7-316423 | 12/1995 |
| JP | 8-283343 | 10/1996 |
| JP | 2002-538257 | 11/2002 |
| JP | 2007-046061 | 2/2007 |
| WO | WO-00/52094 A1 | 9/2000 |
| WO | WO 01/27124 A1 | 4/2001 |
| WO | WO-2004/087775 A1 | 10/2004 |

OTHER PUBLICATIONS

English translation of JP-07316423.*
Coleman et al., "General Theory of Stationary Random Sequences with Applications to the Tacticity of Polymers", Journal of Polymer Science, 1963, Part A, vol. 1(10), pp. 3183-3197.
Tsutsui et al., "Propylene Homo- and Copolymerization with Ethylene Using an Ethylenebis(1-indenyl) Zirconium Dichloride and Methylaluminoxane Catalyst System", Polymer, 1989, vol. 30(7), pp. 1350-1356.
International Search Report in PCT/JP2009/055740 dated Jul. 7, 2009.
Notification of First Office Action in CN Appln No. 200980109115.1 dated Jan. 4, 2012.

* cited by examiner

*Primary Examiner* — Randy Gulakowski
*Assistant Examiner* — Jeffrey Washville
(74) *Attorney, Agent, or Firm* — Foley & Lardner LLP

(57) ABSTRACT

An object of the present invention is to provide resin compositions which have excellent tensile strength, impact resistance and appearance without deterioration in properties inherent to general-purpose engineering plastics and propylene resins and to provide uses thereof.
The resin compositions of the present invention contain 20 to 80 wt % of a general-purpose engineering plastic (A), 10 to 50 wt % of a polypropylene resin (B) and 1 to 30 wt % of a modified propylene resin (C), and the modified propylene resin (C) is obtained by modifying a resin composition (C-3) which includes 0 to 40 wt % of a polypropylene (C-1) having a melting point of not less than 120° C., and 60 to 100 wt % of a propylene/C2 or C4-10 α-olefin copolymer (C-2) having a melting point (Tm) of less than 120° C. or not showing a melting point peak in DSC.

10 Claims, No Drawings

RESIN COMPOSITION AND USE THEREOF

FIELD OF THE INVENTION

The present invention relates to resin compositions and uses thereof. In more detail, the present invention relates to resin compositions which contain a general-purpose engineering plastic, a polypropylene resin and a specific modified propylene resin and which are molded into molded articles such as automobile parts and home electrical appliance parts. The invention also relates to uses of the compositions.

BACKGROUND OF THE INVENTION

Polyamides have excellent heat resistance and chemical resistance and are generally used as engineering plastics. The polyamides, however, have high water-absorbing properties and reduce elastic modulus or show bad dimensional stability when they absorb water.

To compensate for such defects of the polyamides, it has been a conventional practice to blend the polyamides with polypropylene that is a non-polar resin having low water absorbability and excellent heat resistance. They are immiscible by simple mixing such as kneading, and therefore a compatibilizer is used in the mixing.

For example, Patent Document 1 discloses automobile connectors which are molded from a polyamide composition containing a polyamide, a polypropylene, a modified polymer obtained by introducing an acid anhydride group into polypropylene and/or a vinyl aromatic compound/olefin copolymer, and an olefin oligomer or a vinyl aromatic compound/olefin copolymerized oligomer which is liquid and contains an acid anhydride group.

Patent Document 1 describes that the polyamide compositions obtained by adding the modified propylene resin and the oligomer to polyamide and polypropylene achieve improved heat resistance and dimensional stability. However, the polyamide compositions of Patent Document 1 essentially contain the oligomer having an acid anhydride group and therefore the polyamide compositions have room for improvement in properties such as strength.

Further, Patent Document 2 discloses thermoplastic polypropylene-polyamide forming materials that contain at least a polypropylene homopolymer and/or a polypropylene copolymer, a polyamide, and an olefinically unsaturated carboxylic acid and/or an olefinically unsaturated carboxylic acid derivative.

Patent Document 2 describes that the thermoplastic polypropylene-polyamide forming materials possess high toughness, rigidity and thermo-molding stability. However, the thermoplastic polypropylene-polyamide forming materials of Patent Document 2 have room for improvement in properties such as compatibility between the polypropylene and the polyamide.

Furthermore, Patent Document 3 discloses polyamide/polyolefin resin compositions containing a polyamide resin, a polypropylene resin and a modified polyolefin resin.

Patent Document 3 describes that the polyamide/polyolefin resin compositions have high impact resistance and weld strength. The modified polyolefin resins of Patent Document 3 are obtained by adding an acid anhydride to a mixture of a polypropylene resin and a polyethylene resin. The modified resins are poor in compatibility between the polyamide resin and the polypropylene resin and therefore have room for improvement in properties such as appearance and tensile elongation.

Patent Document 1: JP-A-H01-311580
Patent Document 2: JP-A-H03-109452
Patent Document 3: JP-A-H04-252264

SUMMARY OF THE INVENTION

Problems to be Solved by the Invention

It is an object of the present invention that a specific modified propylene resin is used as a compatibilizer for a general-purpose engineering plastic and a polypropylene resin and the obtainable resin compositions achieve excellent tensile strength and impact resistance and have an excellent appearance without deterioration in properties of the general-purpose engineering plastic and the propylene resin. It is another object of the invention to provide uses of the compositions.

Means to Solve the Problem

The present inventors studied diligently and have found that the aforesaid problems in the art can be solved by using a specific modified propylene resin described below as a compatibilizer. The present invention has been completed based on the finding.

A resin composition according to the present invention comprises 20 to 80 wt % of a general-purpose engineering plastic (A), 10 to 50 wt % of a polypropylene resin (B) and 1 to 30 wt % of a modified propylene resin (C) (wherein the total of (A), (B) and (C) is 100 wt %), the modified propylene resin (C) being obtained by modifying a resin composition (C-3) which comprises 0 to 40 wt % of a polypropylene (C-1) having a melting point (Tm) of not less than 120° C. as measured by differential scanning calorimetry (DSC), and 60 to 100 wt % of a propylene/C2 or C4-10 α-olefin copolymer (C-2) having a melting point (Tm) of less than 120° C. as measured by DSC or not showing a melting point peak in DSC (wherein the total of (C-1) and (C-2) is 100 wt %).

The general-purpose engineering plastic (A) is preferably at least one selected from the group consisting of polyamides, polyethylene terephthalates and polybutylene terephthalates.

The polypropylene resin (B) is preferably a propylene homopolymer or a propylene/C2 or C4-10 α-olefin copolymer and has a melting point (Tm) of not less than 120° C. as measured by differential scanning calorimetry (DSC).

The propylene/α-olefin copolymer (C-2) preferably has a heat of fusion ΔH of over 40 J/g.

The propylene/α-olefin copolymer (C-2) is preferably a propylene/1-butene copolymer, which more preferably:

(1) contains structural units derived from propylene in an amount of 50 to 95 mol % and structural units derived from 1-butene in an amount of 5 to 50 mol %;

(2) has a molecular weight distribution (Mw/Mn) of not more than 3.0 as measured by gel permeation chromatography (GPC); and (3) has a melting point (Tm) of not more than 110° C. as measured by differential scanning calorimetry (DSC) or does not show a melting point peak in DSC; and particularly preferably further satisfies:

$$-2.6M+130 \leq Tm \leq -2.3M+155 \qquad (4)$$

wherein Tm is the melting point (° C.) as measured by differential scanning calorimetry (DSC) and M is the content (mol %) of structural units derived from 1-butene.

The modified propylene resin (C) is preferably obtained by graft modifying the resin composition (C-3) with an unsaturated carboxylic acid or a derivative thereof.

An aspect of the present invention is directed to a molded article manufactured by molding the resin composition.

The molded article is preferably an automobile part or a home electrical appliance part.

Another aspect of the present invention is directed to a method characterized in that 1 to 30 wt % of a modified propylene resin (C) is used as a compatibilizer for 20 to 80 wt % of a general-purpose engineering plastic (A) and 10 to 50 wt % of a polypropylene resin (B) (wherein the total of (A), (B) and (C) is 100 wt %), the modified propylene resin (C) being obtained by modifying a resin composition (C-3) which comprises 0 to 40 wt % of a polypropylene (C-1) having a melting point (Tm) of not less than 120° C. as measured by differential scanning calorimetry (DSC), and 60 to 100 wt % of a propylene/C2 or C4-10 α-olefin copolymer (C-2) having a melting point (Tm) of less than 120° C. as measured by DSC or not showing a melting point peak in DSC (wherein the total of (C-1) and (C-2) is 100 wt %).

Advantageous Effects of the Invention

In the resin compositions of the present invention, the modified propylene resin (C) compatibilizes the general-purpose engineering plastic (A) and the polypropylene resin (B) homogeneously. The resin compositions have excellent tensile strength and impact resistance and a good appearance. The resin compositions of the invention maintain the inherent properties of the general-purpose engineering plastic (A) and the polypropylene resin (B) such as low-water-absorbing properties, heat resistance, chemical resistance and flexural modulus. The resin compositions are therefore suitably molded into molded products such as automobiles and home electrical appliances.

PREFERRED EMBODIMENTS FOR CARRYING OUT THE INVENTION

The present invention will be described in detail below.

A resin composition according to the present invention contains 20 to 80 wt % of a general-purpose engineering plastic (A), 10 to 50 wt % of a polypropylene resin (B) and 1 to 30 wt % of a modified propylene resin (C) (wherein the total of (A), (B) and (C) is 100 wt %). The modified propylene resin (C) is obtained by modifying a resin composition (C-3) which includes 0 to 40 wt % of a polypropylene (C-1) having a melting point (Tm) of not less than 120° C. as measured by differential scanning calorimetry (DSC), and 60 to 100 wt % of a propylene/C2 or C4-10 α-olefin copolymer (C-2) having a melting point (Tm) of less than 120° C. as measured by DSC or not showing a melting point peak in DSC (wherein the total of (C-1) and (C-2) is 100 wt %).

<General-Purpose Engineering Plastics (A)>

The general-purpose engineering plastics used in the present invention are not particularly limited. At least one selected from the group consisting of polyamides, polyethylene terephthalates and polybutylene terephthalates is generally used. In the present invention, the general-purpose engineering plastics may be used singly, or two or more kinds thereof may be used in combination.

The polyamides for use in the present invention are not particularly limited and include aliphatic polyamides, aromatic polyamides and semi-aromatic polyamides. Of these polyamides, polyamide 6 is preferably used because of its easy availability in the market and high heat resistance.

The polyamides for use in the present invention may be produced by, for example, ring-opening polymerization of lactams or the like. The lactam is preferably ε-caprolactam, in which case the ring-opening polymerization gives polyamide 6.

Alternatively, the polyamide for use in the present invention may be produced by the polycondensation of a C4-12 dicarboxylic acid and a C2-13 diamine.

Typical examples of the dicarboxylic acids for the production of polyamides include terephthalic acid, isophthalic acid, adipic acid, pimelic acid, suberic acid, azelaic acid, sebacic acid and dodecane dicarboxylic acid. Further, derivatives thereof may be used, with examples including esters, acid chlorides and amine salts. These may be used singly, or two or more kinds thereof may be used in combination.

Typical examples of the diamines for the production of polyamides include p-phenylenediamine, m-phenylenediamine, hexamethylenediamine, octamethylenediamine and derivatives thereof. These may be used singly, or two or more kinds thereof may be used in combination.

The polyamides generally have a melting point (Tm) of 175 to 330° C., and preferably 210 to 330° C. as measured by differential scanning calorimetry (DSC). When the polyamide has a melting point in this range, the resin composition of the present invention shows excellent heat resistance.

The polyethylene terephthalates for use in the present invention are copolymers of ethylene glycol and terephthalic acid. Conventionally known polyethylene terephthalates may be used in the present invention.

For example, there may be used commercially available polyethylene terephthalates having a melting point (Tm) of 245 to 255° C. as measured by differential scanning calorimetry (DSC).

The polybutylene terephthalates for use in the present invention are copolymers of 1,4-butanediol and terephthalic acid. Conventionally known polybutylene terephthalates may be used in the present invention.

For example, there may be used commercially available polybutylene terephthalates having a melting point (Tm) of 225 to 230° C. as measured by differential scanning calorimetry (DSC).

<Polypropylene Resins (B)>

The polypropylene resins (B) used in the present invention are not particularly limited. Generally, the melting point (Tm) thereof as measured by differential scanning calorimetry (DSC) is not less than 120° C., preferably in the range of 120 to 170° C., more preferably 120 to 160° C., and particularly preferably 130 to 155° C.

The polypropylene resin (B) is preferably a crystalline polypropylene having an isotactic index I.I. (boiling n-heptane insoluble component) of not less than 75 wt %, and more preferably in the range of 75 to 99 wt %.

The polypropylene resins (B) usually have a density of 890 to 920 kg/m³ and a melt flow rate (ASTM D1238, 230° C.) of 0.1 to 20 g/10 min, preferably 1 to 10 g/10 min. When the melt flow rate is 1 g/10 min or more, the resin composition of the present invention shows excellent molding properties in molten state. And it is preferable that the melt flow rate is 10 g/10 min or less because strength of the resin composition is not deteriorated.

In a preferred embodiment, the polypropylene resin (B) is a propylene homopolymer or a propylene/C2 or C4-10 α-olefin copolymer. The propylene/C2 or C4-10 α-olefin copolymer as the polypropylene resin (B) usually contains structural units derived from the C2 or C4-10 α-olefin at not more than 10 mol %, and preferably less than 5 mol %.

The α-olefins include ethylene, 1-butene, 1-pentene, 1-hexene, 1-heptene, 1-octene, 1-decene, 4-methyl-1-pentene and the like. A single or two or more kinds of these olefins may be used.

The copolymer may be a random polypropylene or a block polypropylene, and is more preferably a random polypropylene.

The polypropylene resins (B) may be produced with a solid titanium catalyst (Ziegler catalyst) component or a metallocene compound catalyst component. Commercially available products may be used as polypropylene resins (B), with examples including Prime Polypro™ F113G (manufactured by Prime Polymer Co., Ltd.) and Prime Polypro™ CJ700 (manufactured by Prime Polymer Co., Ltd.).

<Modified Propylene Resins (C)>

The modified propylene resins (C) for use in the present invention is obtained by modifying a resin composition (C-3) which contains 0 to 40 wt % of a polypropylene (C-1) having a melting point (Tm) of not less than 120° C. as measured by differential scanning calorimetry (DSC), and 60 to 100 wt % of a propylene/C2 or C4-10 α-olefin copolymer (C-2) having a melting point (Tm) of less than 120° C. as measured by DSC or not showing a melting point peak in DSC.

(Polypropylenes (C-1))

The polypropylenes (C-1) have a melting point (Tm) of not less than 120° C. as measured by differential scanning calorimetry (DSC). The polypropylenes herein may be polypropylene resins that are described as the polypropylene resins (B) and satisfy this condition.

(Propylene/α-Olefin Copolymers (C-2))

The propylene/C2 or C4-10 α-olefin copolymers (C-2) (hereinafter, also referred to as the propylene/α-olefin copolymers (C-2)) are not particularly limited as long as they have a melting point (Tm) of less than 120° C. as measured by DSC or do not show a melting point peak in DSC. Various copolymers may be used as the copolymers (C-2).

The C2 and C4-10 α-olefins include ethylene, 1-butene, 1-pentene, 1-hexene, 1-heptene, 1-octene, 1-decene, 4-methyl-1-pentene and the like. Of these olefins, 1-butene is preferable in view of economic efficiency and compatibility with the polypropylenes. That is, a preferred propylene/α-olefin copolymer (C-2) is a propylene/1-butene copolymer.

The propylene/α-olefin copolymers (C-2) preferably have a heat of fusion (ΔH) which is above 40 J/g, more preferably not less than 41 J/g, particularly preferably not less than 46 J/g, and is preferably not more than 70 J/g, more preferably not more than 60 J/g, particularly preferably not more than 50 J/g.

The propylene/1-butene copolymer preferably satisfies the requirements (1) to (3) below and more preferably further satisfies the requirement (4) below.

(1) The copolymer contains structural units derived from propylene in an amount of 50 to 95 mol % and structural units derived from 1-butene in an amount of 5 to 50 mol %.

(2) The copolymer has a molecular weight distribution (Mw/Mn) of not more than 3.0 as measured by gel permeation chromatography (GPC).

(3) The copolymer has a melting point (Tm) of not more than 110° C. as measured by differential scanning calorimetry (DSC) or does not show a melting point peak in DSC.

(4) The copolymer satisfies the relation: $-2.6M+130 \leq Tm \leq -2.3M+155$ wherein Tm is the melting point (° C.) as measured by differential scanning calorimetry (DSC) and M is the content (mol %) of structural units derived from 1-butene.

These requirements will be described below.

[Requirement (1)]

According to the requirement (1), the propylene/1-butene copolymer contains structural units derived from propylene in an amount of 50 to 95 mold, preferably 55 to 93 mold, more preferably 60 to 90 mol %, particularly preferably 60 to 79 mol %, and structural units derived from 1-butene in an amount of 5 to 50 mold, preferably 7 to 45 mol %, more preferably 10 to 40 mol %, particularly preferably 21 to 40 mold.

When the content of structural units derived from 1-butene is 5 mol % or more, the obtainable copolymer can compatibilize the general-purpose engineering plastic (A) and the polypropylene resin (B) homogeneously to give a resin composition having excellent tensile strength, impact resistance and appearance. When the content is not more than 50 mol %, excellent handling properties are obtained in the production of the resin compositions of the present invention.

The propylene/1-butene copolymer may contain structural units derived from α-olefins other than propylene and 1-butene in amounts not detrimental to the objects of the present invention, for example not more than 10 mol %.

[Requirement (2)]

According to the requirement (2), the propylene/1-butene copolymer has a molecular weight distribution (Mw/Mn) of not more than 3.0, preferably in the range of 2.0 to 3.0, and more preferably 2.0 to 2.5 as measured by gel permeation chromatography (GPC). The molecular weight distribution herein is in terms of polypropylene. When Mw/Mn is in the above range, the propylene/1-butene copolymer has a low content of low-molecular weight components.

The Mw/Mn may be determined by gel permeation chromatography under conditions as will be described later in the working examples.

[Requirement (3)]

According to the requirement (3), the propylene/1-butene copolymer has a melting point (Tm) of not more than 110° C. as measured by differential scanning calorimetry or does not show a melting point peak in DSC. Preferably, the melting point is in the range of 50 to 110° C., more preferably 60 to 100° C., still more preferably 65 to 90° C., and particularly preferably 76 to 90° C.

It is particularly preferable that the melting point (Tm) is 50° C. or more because good handling properties are achieved in the production of the resin compositions of the present invention. It is particularly preferable that the melting point is not more than 110° C. because the obtainable copolymer can compatibilize the general-purpose engineering plastic (A) and the polypropylene resin (B) homogeneously to give a resin composition having excellent tensile strength, impact resistance and appearance.

The melting point may be determined using a differential scanning calorimeter (DSC). In detail, a sample weighing approximately 5 mg may be placed in an aluminum pan, heated to 200° C., held at 200° C. for 5 minutes, cooled to −40° C. at a rate of 10° C./min, held at −40° C. for 5 minutes, and heated at a temperature increasing rate of 10° C./min. The melting point may be determined from an endothermic curve recorded during the temperature increasing.

In a preferred embodiment, the propylene/1-butene copolymer further satisfies the following requirement (4), and more preferably further satisfies any of the requirements (5) to (8).

[Requirement (4)]

According to the requirement (4), the propylene/1-butene copolymer satisfies the relation:

$$-2.6M+130 \leq Tm \leq -2.3M+155$$

wherein Tm is the melting point (° C.) as measured by differential scanning calorimetry and M is the content (mol %) of structural units derived from 1-butene.

When the melting point (Tm) is in the aforementioned range and the copolymer satisfies the above relation, excellent balance is achieved between handling properties in the production of the resin compositions of the present invention and compatibilizing effects for the general-purpose engineering plastic (A) and the polypropylene resin (B).

[Requirement (5)]

According to the requirement (5), the propylene/1-butene copolymer has a melt flow rate (MFR) determined in accordance with ASTM D1238 at 230° C. and 2.16 kg load in the range of 0.01 to 1000 g/10 min, preferably 0.1 to 100 g/10 min, and more preferably 1 to 20 g/10 min. It is preferable that MFR is not less than 0.01 g/10 min because the resin composition of the present invention shows excellent molding properties in molten state. It is preferable that MFR is not more than 1000 g/10 min because the resin composition is free from deterioration in mechanical properties.

[Requirement (6)]

According to the requirement (6), the propylene/1-butene copolymer has a parameter B value indicating the randomness in the distribution of comonomer sequences in the range of 1.0 to 1.5, preferably 1.0 to 1.3, and more preferably 1.0 to 1.2.

It is preferable that the B value is in the above range because propylene and 1-butene are copolymerized more uniformly and the obtainable copolymer can compatibilize the general-purpose engineering plastic (A) and the polypropylene resin (B) homogeneously.

The parameter B value has been proposed by Coleman et al. (B. D. Cole-man and T. G. Fox, J. Polym. Sci., Al, 3183 (1963)) and is defined as follows:

$$B=P_{12}/(2P_1 \cdot P_2)$$

In the above equation, $P_1$ and $P_2$ represent the contents of a first monomer and a second monomer, respectively, and $P_{12}$ is the proportion of (first monomer)-(second monomer) sequences relative to the total diad sequences. When the B value is 1, the copolymer obeys the Bernoulli distribution. When B<1, the copolymer is a block copolymer. When B>1, the copolymer is an alternating copolymer.

[Requirement (7)]

According to the requirement (7), the propylene/1-butene copolymer satisfies the relation: C≥−1.5M+75 wherein C is the crystallinity [%] measured by X-ray diffractometry and M is the content [mol %] of structural units derived from 1-butene.

The crystallinity (C) of the propylene/1-butene copolymer is usually not more than 65%, preferably in the range of 15 to 65%, and more preferably 20 to 60%. When the crystallinity (C) is 15% or more, good handling properties are achieved in the production of the resin compositions of the present invention. On the other hand, when the crystallinity is not more than 65%, the obtainable copolymer can compatibilize the general-purpose engineering plastic (A) and the polypropylene resin (B) homogeneously to give a resin composition having excellent tensile strength, impact resistance and appearance.

[Requirement (8)]

According to the requirement (8), when the propylene/1-butene copolymer is analyzed by $^{13}$C-NMR spectrometry (hexachlorobutadiene solution, tetramethylsilane standard) with respect to the side-chain methyl group in the propylene-derived structural unit that is the second unit in (i) head-to-tail coupled propylene-derived structural unit triad sequences or (ii) propylene/butene triad sequences composed of head-to-tail coupled propylene-derived structural unit(s) and butene-derived structural unit(s) and having the propylene-derived structural unit as the second unit, the areas of peaks observed at 21.0 to 21.9 ppm represent not less than 90%, preferably not less than 92%, and more preferably not less than 94% of the total of areas at 19.5 to 21.9 ppm as 100%. When the peak area is in this range, the content of low-boiling components having low stereoregularity is reduced.

The stereoregularity of the propylene/1-butene copolymer according to the present invention may be evaluated based on the triad tacticity (mm fraction).

In propylene/butene-1 random copolymer as an example, the mm fraction is defined as a proportion of triad sequences that have the methyl groups branched in the same direction, when all the propylene unit triad sequences in the polymer chain that are head-to-tail coupled are shown as a planar zigzag structure. The mm fraction is determined from a $^{13}$C-NMR spectrum as described below.

In the determination of the mm fraction from a $^{13}$C-NMR spectrum, the polymer chains are analyzed to determine the mm fraction of triad sequences containing a propylene unit(s), in detail (i) head-to-tail coupled propylene unit triad sequences and (ii) propylene unit/α-olefin unit triad sequences that are composed of head-to-tail coupled propylene unit(s) and α-olefin unit(s) and have the propylene unit as the second unit.

The mm fraction is obtained from peak intensities assigned to the side-chain methyl groups in the second units (propylene units) of the triad sequences (i) and (ii). A detailed description is given below.

To obtain a $^{13}$C-NMR spectrum of the propylene/1-butene copolymer, the propylene/1-butene copolymer is completely dissolved in a lock solvent consisting of hexachlorobutadiene and a small amount of deuterated benzene in a sample tube, and the resultant sample is analyzed by complete proton decoupling method at 120° C. Measurement conditions are such that the flip angle is 45° and the pulse intervals are at least $3.4T_1$ ($T_1$ is the longest spin-lattice relaxation time of the methyl group). The methylene and methine groups have shorter $T_1$ than that of the methyl group, and therefore all the carbon atoms in the sample will have a magnetization recovery rate of 99% or more under the above conditions. The chemical shifts are determined based on tetramethylsilane, and the peak assigned to the methyl group carbon of the third unit in head-to-tail coupled propylene unit pentad sequences (mmmm) is determined to be 21.593 ppm and other carbon peaks are determined based on this peak.

With respect to the $^{13}$C-NMR spectrum of the propylene/1-butene copolymer recorded as above, the regions having methyl carbon peaks assigned to the side-chain methyl groups of the propylene units (approximately 19.5 to 21.9 ppm) are divided into the first peak region (approximately 21.0 to 21.9 ppm), the second peak region (approximately 20.2 to 21.0 ppm) and the third peak region (approximately 19.5 to 20.2 ppm).

In these regions, the side-chain methyl groups in the second units (propylene units) of the head-to-tail coupled triad sequences (i) and (ii) give peaks as shown in Table 1.

TABLE 1

| | | Methyl carbon regions (19.5-21.9 ppm) | | |
|---|---|---|---|---|
| | Shifts | First region (ppm) 21.0-21.9 | Second region (ppm) 20.2-21.0 | Third region (ppm) 19.5-20.2 |
| Head-to-tail coupling | Sequence (i) | PPP (mm) | PPP (mr) | PPP (rr) |
| | Sequence (ii) | PPB (mm) BPB (mm) | PPB (mr) BPB (mr) | PPB (rr) BPB (rr) |

In Table 1, P denotes a unit derived from propylene, and B denotes a unit derived from the α-olefin such as butene.

Of the head-to-tail coupled triad sequences (i) and (ii) given in Table 1, the triad sequences (i) PPP (mm), PPP (mr) and PPP (rr) consisting of three propylene units are illustrated below in planar zigzag structures reflecting the branching direction of the methyl groups. These illustrations of PPP also apply to mm, mr and rr couplings in the triad sequences (ii) (PPB and BPB) that contain an α-olefin unit(s).

[Chem. 1]

PPP (mm):

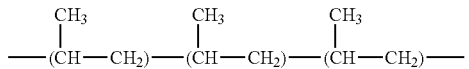

PPP (mr):

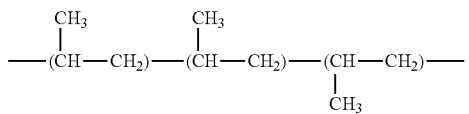

PPP (rr):

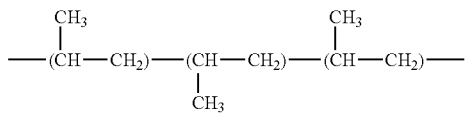

In the first region, the methyl groups in the second units (propylene units) of the mm-coupled triad sequences PPP, PPB and BPB resonate.

In the second region, the methyl groups in the second units (propylene units) of the mr-coupled triad sequences PPP, PPB and BPB, and the methyl groups in the second units (propylene units) of the rr-coupled triad sequences PPB and BPB resonate.

In the third region, the methyl groups in the second units (propylene units) of the rr-coupled triad sequences PPP resonate.

Accordingly, the triad tacticity (mm fraction) of the propylene elastomer is a proportion (percentage) of the area of the peaks observed in the range of 21.0 to 21.9 ppm (the first region) relative to the total (100%) of the areas of the peaks found within 19.5 to 21.9 ppm (the methyl carbon regions) according to measurement by $^{13}$C-NMR spectrometry (hexachlorobutadiene solution, tetramethylsilane standard) with respect to the side-chain methyl groups in the second propylene units of (i) the head-to-tail coupled propylene unit triad sequences or (ii) the propylene/α-olefin triad sequences composed of head-to-tail coupled propylene unit(s) and α-olefin unit(s) and having the propylene unit as the second unit. Specifically, the mm fraction may be obtained from the following equation:

$$\text{mm fraction (\%)} = \frac{[PPP(mm) + PPB(mm) + BPB(mm)]}{\substack{\text{Intensities of methyl groups} \\ [PPP(mm) + PPB(mm) + \\ BPB(mm) + PPP(mr) + \\ PPB(mr) + BPB(mr) + \\ PPP(rr) + PPB(rr) + BPB(rr)]}} \times 100 \quad \text{[Formula 1]}$$

The propylene/1-butene copolymer according to the present invention has the mm fraction determined in the way described above of usually 90% or more, preferably 92% or more, and more preferably 94% or more.

The peak area of the methyl groups C can be obtained from the peak area of the adjacent methine groups (resonating at near 31.3 ppm). The peak area of the methyl groups D is half the combined peak areas of α and β methylene carbons in the structure (iv) (resonating at near 34.3 ppm and near 34.5 ppm). The peak area of the methyl groups D' can be obtained from the peak area of the methine groups (resonating at near 33.3 ppm) adjacent to the methyl groups of the methyl groups E' in the structure (v). The peak area of the methyl groups E can be obtained from the peak area of the adjacent methine carbons (resonating at near 33.7 ppm). The peak area of the methyl groups E' can be obtained from the peak area of the adjacent methine carbons (resonating at near 33.3 ppm).

Accordingly, subtracting these peak areas from the total peak areas in the second and third regions gives an area of the peaks assigned to the methyl groups in the head-to-tail coupled propylene unit triad sequences (i) and (ii).

The mm fraction is calculated according to the above-described formula based on the peak area of the methyl groups in the head-to-tail coupled propylene unit triad sequences (i) and (ii) provided by the above subtraction. The respective carbon peaks found in the spectrum may be assigned with reference to the literature (Polymer, 30, 1350 (1989)).

The propylene/α-olefin copolymers (C-2), preferably propylene/1-butene copolymer, may be favorably obtained by copolymerizing propylene and a C2 or 4-10 α-olefin which is preferably 1-butene and optionally small amounts of other olefins as required in the presence of a Ziegler catalyst or a catalyst containing a metallocene compound. In particular, from the viewpoint of handling properties in the molding of the obtainable resin compositions, the copolymer (C-2) is preferably produced using a metallocene compound catalyst component. For example, the copolymer may be produced by methods described in WO 2004/087775 and WO 01/27124.

In a more preferred embodiment, the propylene/α-olefin copolymer (C-2) for use in the present invention is produced by copolymerizing propylene and an α-olefin in the presence of a catalyst that contains a transition metal compound (1a) represented by Formula (1a) below. Herein, the catalyst containing the transition metal compound (1a) preferably contains together with the transition metal compound (1a) at least one compound selected from group consisting of (2a) organometallic compounds, (2b) organoaluminum oxy-compounds and (2c) compounds capable of reacting with the transition metal compound (1a) to form an ion pair.

[Chem. 2]

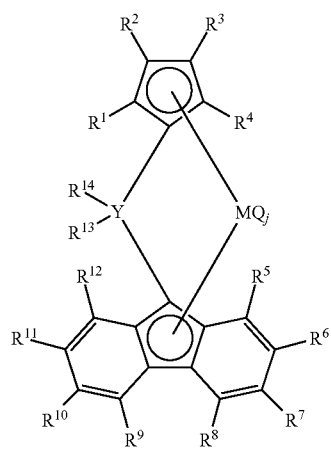

(1a)

In Formula (1a), $R^1$ and $R^3$ are each a hydrogen atom; $R^2$ and $R^4$ are each selected from hydrocarbon groups and silicon-containing groups and may be the same or different from each other; $R^5$, $R^6$, $R^7$, $R^8$, $R^9$, $R^{10}$, $R^{11}$, $R^{12}$, $R^{13}$ and $R^{14}$ are each selected from hydrogen atom, hydrocarbon groups and silicon-containing groups and may be the same or different from one another; adjacent substituent groups of $R^5$ to $R^{12}$ may be linked with each other to form a ring; $R^{13}$ and $R^{14}$ are the same or different from each other and may be linked together to form a ring; M is a Group 4 transition metal; Y is a carbon atom; Q is a halogen, a hydrocarbon group, an anionic ligand or a neutral ligand capable of coordination via a lone pair of electrons, and may be the same or different when plural; and j is an integer ranging from 1 to 4.

Examples of the hydrocarbon groups include linear hydrocarbon groups such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups such as isopropyl group, tert-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; saturated cyclic hydrocarbon groups such as cyclopentyl group, cyclohexyl group, cycloheptyl group, cyclooctyl group, norbornyl group and adamantyl group; unsaturated cyclic hydrocarbon groups such as phenyl group, tolyl group, naphthyl group, biphenyl group, phenanthryl group and anthracenyl group; saturated hydrocarbon groups substituted with unsaturated cyclic hydrocarbon groups, such as benzyl group, cumyl group, 1,1-diphenylethyl group and triphenylmethyl group; and heteroatom-containing hydrocarbon groups such as methoxy group, ethoxy group, phenoxy group, furyl group, N-methylamino group, N,N-dimethylamino group, N-phenylamino group, pyrryl group and thienyl group.

Examples of the silicon-containing groups include trimethylsilyl group, triethylsilyl group, dimethylphenylsilyl group, diphenylmethylsilyl group and triphenylsilyl group.

Adjacent substituent groups of $R^5$ to $R^{12}$ may link together to form a ring. Examples of such substituted fluorenyl groups include benzofluorenyl group, dibenzofluorenyl group, octahydrodibenzofluorenyl group, octamethyloctahydrodibenzofluorenyl group and octamethyltetrahydrodicyclopentafluorenyl group.

$R^{13}$ and $R^{14}$ are the same or different from each other and may be linked together to form a ring.

In the Formula (1a), $R^2$ and $R^4$ which are the substituent groups on the cyclopentadienyl ring are preferably C1-20 hydrocarbon groups. Examples of the C1-20 hydrocarbon groups include the aforementioned hydrocarbon groups. More preferably, $R^2$ is a bulky substituent group such as tert-butyl group, adamantyl group or triphenylmethyl group, and $R^4$ is a sterically smaller substituent group than $R^2$, such as methyl group, ethyl group or n-propyl group. As used herein, the words "sterically smaller" mean the volume which the substituent group occupies.

Of the substituent groups $R^5$ to $R^{12}$ on the fluorene ring in Formula (1a), arbitrary two or more groups of $R^6$, $R^7$, $R^{10}$ and $R^{11}$ are preferably C1-20 hydrocarbon groups. Examples of the C1-20 hydrocarbon groups include the aforesaid hydrocarbon groups. For the purpose of easy synthesis of the ligand, the fluorene ring is preferably symmetrical, in detail $R^6$ and $R^{11}$ are the same groups and $R^7$ and $R^{10}$ are the same groups. In one of such preferred embodiments, $R^6$ and $R^7$ form an aliphatic ring (AR-1) and $R^{10}$ and $R^{11}$ form an aliphatic ring (AR-2) identical to the aliphatic ring (AR-1).

Referring to Formula (1a), Y which bridges the cyclopentadienyl ring and the fluorenyl ring is a carbon atom.

In Formula (1a), M denotes a Group 4 transition metal such as Ti, Zr or Hf; Q denotes a halogen atom, a hydrocarbon group, an anionic ligand or a neutral ligand capable of coordination via a lone pair of electrons, and may be the same or different when plural; and j is an integer of 1 to 4. When j is 2 or greater, the plurality of Q may be the same or different. The halogens include fluorine, chlorine, bromine and iodine. Examples of the hydrocarbon groups are as described above. Exemplary anionic ligands include alkoxy groups such as methoxy, tert-butoxy and phenoxy; carboxylate groups such as acetate and benzoate; and sulfonate groups such as mesylate and tosylate. The neutral ligands capable of coordination via a lone pair of electrons include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane. In a preferred embodiment, at least one Q is a halogen atom or an alkyl group.

Examples of the transition metal compounds (1a) include but are not limited to dimethylmethylene (3-tert-butyl-5-methylcyclopentadienyl)fluorenylzirconium dichloride, isopropylidene (3-tert-butyl-5-methylcyclopentadienyl)(2,7-di-tert-butylfluorenyl)zirconium dichloride, isopropylidene(3-tert-butyl-5-methylcyclopentadienyl)(3,6-di-tert-butylfluorenyl)zirconium dichloride, isopropylidene(3-tert-butyl-5-methylcyclopentadienyl) (octamethyloctahydridodibenzofluorenyl)zirconium dichloride, diphenylmethylene(3-tert-butyl-5-methylcyclopentadienyl)(fluorenyl)zirconium dichloride, diphenylmethylene (3-tert-butyl-5-methylcyclopentadienyl)(2,7-di-tert-butylfluorenyl)zirconium dichloride, diphenylmethylene(3-tert-butyl-5-methylcyclopentadienyl)(3,6-di-tert-butylfluorenyl)zirconium dichloride and diphenylmethylene (3-tert-butyl-5-methylcyclopentadienyl) (octamethyloctahydridodibenzofluorenyl)zirconium dichloride.

The catalysts that are suitably used in the production of the propylene/α-olefin copolymers (C-2) for use in the present invention contain, together with the transition metal compound (1a) described above, at least one compound selected from the group consisting of (2a) organometallic compounds, (2b) organoaluminum oxy-compounds and (2c) compounds capable of reacting with the transition metal compound (1a) to form an ion pair. These compounds (2a), (2b) and (2c) are not particularly limited. Preferred compounds include those described in WO 2004/087775 and WO 01/27124. Exemplary compounds are described below.

As the organometallic compounds (2a), the following organic compounds of Group 1, 2, 12 and 13 metals are used.

(2a-1) Organoaluminum compounds represented by the Formula: $R^a{}_m Al(OR^b)_n H_p X_q$
wherein $R^a$ and $R^b$ may be the same or different from each other and are each a hydrocarbon group of 1 to 15, and preferably 1 to 4 carbon atoms, X is a halogen atom, $0 < m \le 3$, $0 \le n < 3$, $0 \le p < 3$, $0 \le q < 3$ and $m+n+p+q=3$. Specific examples of such compounds include trimethylaluminum, triethylaluminum, triisobutylaluminum and diisobutylaluminum hydride.

(2a-2) Alkyl complex compounds of Group 1 metal and aluminum, represented by the Formula: $M^2 AlR^a{}_4$
wherein $M^2$ is Li, Na or K, and $R^a$ is a hydrocarbon group of 1 to 15, and preferably 1 to 4 carbon atoms. Specific examples of such compounds include $LiAl(C_2H_5)_4$ and $LiAl(C_7H_{15})_4$.

(2a-3) Dialkyl compounds of Group 2 or 12 metal, represented by the Formula: $R^a R^b M^3$
wherein $R^a$ and $R^b$ may be the same or different from each other and are each a hydrocarbon group of 1 to 15, and preferably 1 to 4 carbon atoms, and $M^3$ is Mg, Zn or Cd.

Of the above organometallic compounds (2a), the organoaluminum compounds are preferred. The organometallic compounds (2a) may be used singly, or two or more kinds thereof may be used in combination.

The organoaluminum oxy-compounds (2b) may be conventionally known aluminoxanes, or benzene-insoluble organoaluminum oxy-compounds as disclosed in JP-A-H02-78687.

For example, the conventionally known aluminoxanes may be prepared by the following processes, and are usually obtained as a solution in a hydrocarbon solvent.

1) An organoaluminum compound such as trialkylaluminum is added to a hydrocarbon medium suspension of a compound containing adsorbed water or a salt containing water of crystallization (such as magnesium chloride hydrate, copper sulfate hydrate, aluminum sulfate hydrate, nickel sulfate hydrate or cerous chloride hydrate), to react the organoaluminum compound with the adsorbed water or the water of crystallization.

(2) Water, ice or water vapor is allowed to act directly on an organoaluminum compound such as trialkylaluminum in a medium such as benzene, toluene, diethyl ether or tetrahydrofuran.

3) An organoaluminum compound such as trialkylaluminum is reacted with an organotin oxide such as dimethyltin oxide or dibutyltin oxide in a medium such as decane, benzene or toluene.

The aluminoxane may contain small amounts of organometallic components. After the solvent or unreacted organoaluminum compound are distilled away from the recovered solution of the aluminoxane, the aluminoxane obtained may be redissolved in a solvent or suspended in a poor solvent for the aluminoxane. Examples of the organoaluminum compounds used in preparing the aluminoxanes include the organoaluminum compounds mentioned above as the organoaluminum compounds (2a-1). Of those compounds, trialkylaluminums and tricycloalkylaluminums are preferred, and trimethylaluminum is particularly preferred. The organoaluminum compounds may be used singly, or two or more kinds thereof may be used in combination.

The benzene-insoluble organoaluminum oxy-compounds usually contain Al components that will dissolve in benzene at 60° C. in an amount of 10% or less, preferably 5% or less, and particularly preferably 2% or less in terms of Al atoms. That is, the organoaluminum oxy-compounds are preferably insoluble or hardly soluble in benzene. The organoaluminum oxy-compounds (2b) may be used singly, or two or more kinds thereof may be used in combination.

The compounds (2c) capable of reacting with the transition metal compound (1a) to form an ion pair include Lewis acids, ionic compounds, borane compounds and carborane compounds as disclosed in JP-A-H01-501950, JP-A-H01-502036, JP-A-H03-179005, JP-A-H03-179006, JP-A-H03-207703, JP-A-H03-207704 and U.S. Pat. No. 5,321,106 specification. Further, heteropoly compounds and isopoly compounds are also usable. The compounds (2c) may be used singly, or two or more kinds thereof may be used in combination.

In the production of the propylene/α-olefin copolymers (C-2) for use in the present invention, the copolymers (C-2) may be produced with particularly high polymerization activity when the catalyst contains the transition metal compound (1a) and the organoaluminum oxy-compound (2b) such as methylaluminoxane.

The polymerization catalysts for the production of the propylene/α-olefin copolymers (C-2) for use in the present invention may contain a carrier or a cocatalyst component as required.

Such catalysts may be prepared by mixing the respective components directly or after the components are supported on carriers. Alternatively, the respective components may be added to the polymerization system simultaneously or successively.

In a preferred embodiment, the propylene/α-olefin copolymer (C-2) for use in the present invention is produced by copolymerizing propylene and a C2 or C4-10 α-olefin which is particularly preferably 1-butene, and optionally small amounts of other olefins in the presence of the aforementioned catalyst. In the copolymerization, the respective monomers may be used in amounts such that the desired ratio of structural units in the obtainable propylene/α-olefin copolymer (C-2) is achieved. In detail, the monomers are desirably used in a propylene/α-olefin molar ratio of 50/50 to 95/5, preferably 55/45 to 93/7, and more preferably 60/40 to 90/10.

The copolymerization conditions are not particularly limited. For example, the polymerization temperature may be usually in the range of −50 to +200° C., preferably 0 to 170° C., and the polymerization pressure may generally range from normal pressure to 10 MPaG, preferably from normal pressure to 5 MPaG. The polymerization reaction may be carried out batchwise, semi-continuously or continuously. In an embodiment, the polymerization may be performed in two or more stages under different reaction conditions. The molecular weight of the propylene/α-olefin copolymer (C-2) may be controlled by the presence of hydrogen in the polymerization system or by changing the polymerization temperature. The molecular weight is also controllable by adjusting the amount of the compound (2a), (2b) or (2c) in the catalyst. When hydrogen is used, the amount thereof may be suitably in the range of about 0.001 to 100 NL per 1 kg of the monomers.

(Resin Compositions (C-3))
(Resin Compositions (C-3))

The resin compositions (C-3) for use in the present invention contain 0 to 40 wt % of the polypropylene (C-1) and 60 to 100 wt % of the propylene/α-olefin copolymer (C-2).

The resin composition (C-3) contains the polypropylene (C-1) in an amount of 0 to 40 wt %, preferably 0 to 35 wt %, more preferably 0 to 30 wt %, still more preferably 5 to 30 wt %, and the propylene/α-olefin copolymer (C-2) in an amount of 60 to 100 wt %, preferably 65 to 100 wt %, more preferably 70 to 100 wt %, still more preferably 70 to 95 wt % relative to 100 wt % of the resin composition. When the resin composition (C-3) has a chemical makeup in the above range, the obtainable resin composition of the present invention containing the general-purpose engineering plastic (A), the polypropylene resin (B) and the modified propylene resin (C) has excellent tensile strength, impact resistance and appearance. The above chemical makeup also ensures that high continuous productivity is achieved in modifying the resin composition (C-3) with an extruder as described later.

In the present invention, the resin composition (C-3) may be prepared by any of the conventionally known methods. For example, the polypropylene (C-1) and the propylene/α-olefin copolymer (C-2) may be mixed together by means of a mixing apparatus such as a twin-cylinder mixer, a ribbon blender or a Henschel mixer and/or may be kneaded together by means of a kneading device such as an extruder, a mixing roll, a Banbury mixer or a kneader.

The resin composition (C-3) obtained by the mixing may be pelletized or granulated with an extruder or the like and then modified to a modified propylene resin (C). Alternatively, the resin composition may be directly modified to a modified propylene resin (C).

The modified propylene resin (C) for use in the present invention may be obtained by modifying the resin composition (C-3).

The resin composition (C-3) may be usually modified by graft-reacting a polar monomer with the resin composition (C-3).

(Polar Monomers)

The polar monomers used for the modification include hydroxyl group-containing ethylenically unsaturated compounds, amino group-containing ethylenically unsaturated compounds, epoxy group-containing ethylenically unsaturated compounds, unsaturated carboxylic acids and derivatives thereof.

Examples of the hydroxyl group-containing ethylenically unsaturated compounds include (meth)acrylates such as hydroxyethyl(meth)acrylate, 2-hydroxypropyl(meth)acrylate, 3-hydroxypropyl (meth) acrylate, 2-hydroxy-3-phenoxy-propyl(meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; 10-undecen-1-ol, 1-octen-3-ol, 2-methanol norbornene, hydroxystyrene, hydroxyethyl vinyl ether, hydroxybutyl vinyl ether, N-methylolacrylamide, 2-(meth)acroyloxyethyl acid phosphate, glycerol monoallyl ether, allyl alcohol, allyloxyethanol, 2-buten-1,4-diol and glycerol monoalcohol.

Examples of the amino group-containing ethylenically unsaturated compounds include vinyl monomers having at least one amino group or substituted amino group as illustrated below:

[Chem. 3]

wherein $R^1$ denotes a hydrogen atom, a methyl group or an ethyl group; and $R^2$ is a hydrogen atom, an alkyl group of 1 to 12, preferably 1 to 8 carbon atoms or a cycloalkyl group of 6 to 12, preferably 6 to 8 carbon atoms. The alkyl group and the cycloalkyl group may have a substituent group.

Examples of the amino group-containing ethylenically unsaturated compounds include alkyl ester derivatives of acrylic acid or methacrylic acid such as aminoethyl(meth)acrylate, propylaminoethyl(meth)acrylate, dimethylaminoethyl methacrylate, aminopropyl(meth)acrylate, phenylaminoethyl methacrylate and cyclohexylaminoethyl methacrylate; vinylamine derivatives such as N-vinyldiethylamine and N-acetylvinylamine; allylamine derivatives such as allylamine, methacrylamine, N-methylacrylamine, N,N-dimethylacrylamide and N,N-dimethylaminopropylacrylamide; acrylamide derivatives such as acrylamide and N-methylacrylamide; aminostyrenes such as p-aminostyrene; 6-aminohexyl succinimide and 2-aminoethyl succinimide.

The epoxy group-containing ethylenically unsaturated compounds are monomers having at least one or more polymerizable unsaturated bond and at least one or more epoxy group in the molecule. Examples of the epoxy group-containing ethylenically unsaturated compounds include glycidyl acrylate, glycidyl methacrylate; mono- and alkyl-glycidyl esters of dicarboxylic acids (the alkyl group in the case of monoglycidyl ester has 1 to 12 carbon atoms) such as monoglycidyl maleate, diglycidyl maleate, monoglycidyl fumarate, diglycidyl fumarate, monoglycidyl crotonate, diglycidyl crotonate, monoglycidyl tetrahydrophthalate, diglycidyl tetrahydrophthalate, monoglycidyl itaconate, diglycidyl itaconate, monoglycidyl butenetricarboxylate, diglycidyl butenetricarboxylate, monoglycidyl citraconate, diglycidyl citraconate, monoglycidyl ester of endo-cis-bicyclo[2.2.1]hept-5-ene-2,3-dicarboxylic acid (nadic Acid™), diglycidyl ester thereof, monoglycidyl ester of endo-cis-bicyclo[2.2.1]hept-5-ene-2-methyl-2,3-dicarboxylic acid (methylnadic Acid™), diglycidyl ester thereof, monoglycidyl allylsuccinate and glycidyl allylsuccinate; alkylglycidyl p-styrenecarboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

Examples of the unsaturated carboxylic acids include acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid. Examples of the derivatives thereof include acid anhydrides, acid halides, amides, imides and esters.

Examples of the unsaturated carboxylic acid derivatives include malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth) acrylate, glycidyl (meth)acrylate, aminoethyl methacrylate and aminopropyl methacrylate.

Of these, (meth)acrylic acid, maleic anhydride, hydroxyethyl (meth)acrylate, glycidyl methacrylate and aminopropyl methacrylate are preferred.

Of the polar monomers as described above, the unsaturated carboxylic acids and the derivatives thereof are preferable because they are easily available in the market and are inexpensive. That is, the modified propylene resin (C) for use in the present invention is preferably obtained by graft modifying the resin composition (C-3) with an unsaturated carboxylic acid or a derivative thereof.

(Preparation of Modified Propylene Resin (C))

The modified propylene resin (C) used in the present invention is obtained by modifying the resin composition (C-3) containing the polypropylene (C-1) and the propylene/α-olefin copolymer (C-2). In a usual embodiment, the resin composition (C-3) is graft polymerized with the polar monomer.

In the graft polymerization of the resin composition (C-3) with the polar monomer as described above, the polar monomer is generally used in an amount of 0.1 to 100 wt %, and preferably 5 to 80 wt % based on 100 wt % of the resin composition (C-3).

The graft polymerization is usually performed in the presence of a radical initiator. The radical initiator may be an organic peroxide or an azo compound.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy)hexyne-3,1,3-bis(t-butylperoxyisopropyl)benzene, 1,1-bis(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide.

Examples of the azo compounds include azoisobutyronitrile and dimethylazoisobutyronitrile.

The radical initiators may be suitably used in an amount of around 0.001 to 10 wt % based on 100 wt % of the resin composition (C-3).

The radical initiators may be directly mixed with the resin composition (C-3) and the polar monomer or may be used after dissolved in a small amount of an organic solvent. The organic solvents are not particularly limited as long as the radical initiators are dissolved therein. Examples of the organic solvents include aromatic hydrocarbon solvents such as benzene, toluene and xylene; aliphatic hydrocarbon solvents such as pentane, hexane, heptane, octane, nonane and decane; alicyclic hydrocarbon solvents such as cyclohexane, methylcyclohexane and decahydronaphthalene; chlorinated hydrocarbons such as chlorobenzene, dichlorobenzene, trichlorobenzene, methylene chloride, chloroform, carbon tetrachloride and tetrachloroethylene; alcohol solvents such as methanol, ethanol, n-propanol, iso-propanol, n-butanol, sec-butanol and tert-butanol; ketone solvents such as acetone, methyl ethyl ketone and methyl isobutyl ketone; ester solvents such as ethyl acetate and dimethyl phthalate; and ether solvents such as dimethyl ether, diethyl ether, di-n-amyl ether, tetrahydrofuran and dioxyanisole.

Reducing substances may be used in the graft polymerization of the polar monomer to the resin composition (C-3). The use of reducing substances increases the graft amount of the polar monomer.

Examples of the reducing substances include iron (II) ion, chromium ion, cobalt ion, nickel ion, palladium ion, sulfites, hydroxylamine, hydrazine and compounds containing such groups as —SH, $SO_3H$, —$NHNH_2$ and —COCH(OH)—.

Specific examples of the reducing substances include ferrous chloride, potassium dichromate, cobalt chloride, cobalt naphthenate, palladium chloride, ethanolamine, diethanolamine, N,N-dimethylaniline, hydrazine, ethyl mercaptan, benzenesulfonic acid and p-toluenesulfonic acid.

The reducing substances may be generally used in an amount of 0.001 to 5 wt %, and preferably 0.1 to 3 wt % based on 100 wt % of the resin composition (C-3) in the present invention.

The resin composition (C-3) may be graft modified with the polar monomer by conventionally known methods. For example, the resin composition (C-3) may be dissolved in an organic solvent, then the polar monomer, the radical initiator and the like may be added to the solution, and the mixture may be heated to perform the reaction at 70 to 200° C., preferably 80 to 190° C. for 0.5 to 15 hours, preferably 1 to 10 hours.

The organic solvents herein are not particularly limited as long as they can dissolve the resin composition (C-3). Examples thereof include aromatic hydrocarbon solvents such as benzene, toluene and xylene, and aliphatic hydrocarbon solvents such as pentane, hexane and heptane.

In another embodiment, the modified propylene resin (C) may be produced without any solvents by reacting the resin composition (C-3) and the polar monomer in an extruder or the like.

In this case, the reaction is desirably carried out at not less than the melting point of the resin composition (C-3), in detail 120 to 250° C., for 0.5 to 10 minutes.

In the modified propylene resin (C), the modification amount (the amount of grafted polar monomer) is usually in the range of 0.05 to 50 wt %, preferably 0.1 to 20 wt %, more preferably 0.1 to 10 wt %, and particularly preferably 0 to 5 wt % based on 100 wt % of the modified propylene resin (C).

The modified propylene resin (C) prepared as described above usually has a melt flow rate of 0.1 to 2000 g/10 min, and preferably 1.0 to 1000 g/10 min as measured in accordance with ASTM D1238 at 230° C. and 2.16 kg load.

The modified propylene resin (C) usually has a density of 875 to 900 kg/m$^3$, and preferably 880 to 895 kg/m$^3$.

The modified propylene resin (C) usually has an limiting viscosity [η] of 0.01 to 6 dl/g, and preferably 0.1 to 5 dl/g as measured at 135° C. in decalin. The melting point of the modified propylene resin (C) is generally in the range of 60 to 160° C., and the crystallinity thereof is usually in the range of 20 to 60%, and preferably 30 to 55%.

(Resin Compositions Containing General-Purpose Engineering Plastic (A), Polypropylene Resin (B) and Modified Propylene Resin (C))

The resin compositions of the present invention include 20 to 80 wt %, preferably 30 to 70 wt % of the general-purpose engineering plastic (A), 10 to 50 wt %, preferably 20 to 45 wt % of the polypropylene resin (B), and 1 to 30 wt %, preferably 3 to 25 wt % of the modified propylene resin (C) (wherein the total of (A), (B) and (C) is 100 wt %).

Because the resin composition of the present invention contains the modified propylene resin (C) as a compatibilizer, the general-purpose engineering plastic (A) and the polypropylene resin (B) are homogeneously compatibilized in the resin composition. As a result, the resin composition shows excellent tensile strength and impact resistance and has good appearance. Further, the resin composition of the invention free from deterioration in properties inherent to the general-purpose engineering plastic (A) and the polypropylene resin (B) such as low-water-absorbing properties, heat resistance, chemical resistance and flexural modulus.

The resin compositions of the present invention may contain additives such as heat stabilizers, UV absorbers, anti-blocking agents, slip agents and antistatic agents in addition to the general-purpose engineering plastic (A), the polypropylene resin (B) and the modified propylene resin (C).

The amount of these additives may be generally in the range of 0.01 to 1 wt %, and preferably 0.02 to 0.6 wt % based on 100 wt % of the components (A), (B) and (C) combined.

The resin compositions of the present invention may be prepared by conventionally known processes without limitation. For example, the general-purpose engineering plastic (A), the polypropylene resin (B) and the modified propylene resin (C) may be mixed together with a mixing apparatus such as a twin-cylinder mixer, a ribbon blender or a Henschel mixer and/or may be kneaded together by means of a kneading device such as an extruder, a mixing roll, a Banbury mixer or a kneader.

The resin composition of the present invention obtained by the mixing may be pelletized or granulated with an extruder or the like, or may be directly molded into molded articles.

(Molded Articles)

Molded articles according to the present invention are obtained by molding the resin compositions described above.

The resin compositions have excellent tensile strength, impact resistance and appearance and also have good dimensional stability. Further, the resin compositions are free from deterioration in properties inherent to the general-purpose engineering plastic (A) and the polypropylene resin (B) such as low-water-absorbing properties, heat resistance, chemical resistance and flexural modulus. Accordingly, the molded articles obtained by molding the resin compositions are suitably used in various applications including automobile parts, home electrical appliance parts and sporting goods.

In particular, suitable applications are automobile parts and home electrical appliance parts which require heat resistance and chemical resistance. Exemplary automobile parts include window washer nozzles and doorknobs. Exemplary home electrical appliance parts include electric wire connectors.

Another aspect of the present invention provides a method in which the modified propylene resin (C) is used as a compatibilizer for the general-purpose engineering plastic (A) and the polypropylene resin (B). In more detail, the method is characterized in that 1 to 30 wt % of the modified propylene resin (C) is used as a compatibilizer for 20 to 80 wt % of the general-purpose engineering plastic (A) and 10 to 50 wt % of the polypropylene resin (B); the modified propylene resin (C) is obtained by modifying the resin composition (C-3) which includes 0 to 40 wt % of the polypropylene (C-1) having a melting point (Tm) of not less than 120° C. as measured by differential scanning calorimetry (DSC), and 60 to 100 wt % of the propylene/C2 or C4-10 α-olefin copolymer (C-2) having a melting point (Tm) of less than 120° C. as measured by DSC or not showing a melting point peak in DSC (wherein the total of (C-1) and (C-2) is 100 wt %). The total of (A), (B) and (C) is 100 wt %.

The modified propylene resins (C) for use in the present invention are suitably used as compatibilizers for resin compositions containing general-purpose engineering resins such as polyamides, polyethylene terephthalates and polybutylene terephthalates, and polypropylenes.

General-purpose engineering resins, in particular polyamides, have excellent heat resistance. However, their water absorbability is so high that the resins reduce elastic modulus or show bad dimensional stability when they absorb water. These problems have been conventionally compensated for by blending the polyamides with polypropylene which is relatively heat resistant in nonpolar resins to give resin compositions. However, they are extremely immiscible with each other and, although the resin composition has suppressed water absorption, properties of the general-purpose engineering resins are greatly deteriorated.

In the present invention, the modified propylene resins (C) as compatibilizers for the general-purpose engineering plastics (A) and the polypropylene resins (B) can suppress water absorption without deteriorating properties of the general-purpose engineering plastics such as heat resistance, chemical resistance and mechanical properties such as flexural modulus, tensile strength and tensile elongation. Accordingly, the resin compositions with excellent dimensional stability can be obtained. Further, because of the high compatibility, the resin compositions of the present invention can give molded articles having a good surface condition.

EXAMPLES

The present invention will be described in greater detail based on examples hereinbelow without limiting the scope of the invention.

In Examples and Comparative Examples, properties were measured or evaluated by the following methods.

[1-Butene Content (M)]

The 1-butene content (M) [mol %] was determined by $^{13}$C-NMR. The content indicates the amount of structural units from 1-butene in propylene/1-butene copolymers.

[Melt Flow Rate (MFR)]

The melt flow rate (MFR) [g/10 min] of propylene/1-butene copolymers was determined in accordance with ASTM D1238 at 230° C. and under a load of 2.16 kg.

[Molecular Weight Distribution (Mw/Mn)]

The molecular weight distribution (Mw/Mn) of propylene/1-butene copolymers was determined as follows using GPC-150C manufactured by Millipore.

The separatory column used was TSK GNH HT having a diameter of 27 mm and a length of 600 mm. The column temperature was 140° C. The mobile phase was o-dichlorobenzene (Wako Pure Chemical Industries, Ltd.) containing 0.025 wt % of BHT (Takeda Chemical Industries, Ltd.) as an antioxidant. The mobile phase was pumped at a rate of 1.0 ml/min. The sample concentration was 0.1 wt %, and the sample injection amount was 500 μl. A differential refractometer was used as a detector.

For polymers with molecular weights Mw<1000 and Mw>4×10$^6$, polystyrene standards manufactured by Toso Corporation were used. For polymers with molecular weights 1000≤Mw≤4×10$^6$, polystyrene standards available from Pressure Chemical Co. were used.

[Melting Point (Tm) and Heat of Fusion (ΔH)]

The melting point (Tm) and the heat of fusion (ΔH) of propylene/1-butene copolymers were determined with DSC-7 (differential scanning calorimeter (DSC)) manufactured by PerkinElmer, Inc.

A sample was preheated with a hot press machine at 200° C. for 4 minutes and was thereafter pressed for 3 minutes to a thickness of 1 mm. The plasticized sheet in a thickness of 1 mm was cooled and solidified by being pressed in a cold press at 20° C. for 4 minutes. The sheeted sample was allowed to stand at room temperature for at least one week. A 5 mg portion was sampled from a central area of the sheet, and was placed in an aluminum pan and was set in DSC measuring device. In a nitrogen atmosphere, the sample was heated from 20° C. to 200° C. at a rate of 10° C./min. The melting point (Tm) was obtained from the peak in the endothermic curve recorded during the temperature increasing. The heat of fusion (ΔH) was determined by dividing the peak area with the sample weight.

[Density]

The density was determined in a density gradient tube at 23° C. in accordance with ASTM D1505.

[Maleic Acid Modification Amount]

The maleic acid content was converted from the oxygen content determined with elemental analyzer Vario EL III manufactured by Elementar Analytical.

[Tensile Yield Strength and Tensile Elongation]

A test piece of 114 mm×18.3 mm×2 mm ASTM IV dumbbell was molded with use of a 50-ton clamping force injection molding apparatus at a cylinder temperature of 245° C. and a mold temperature of 80° C. The dumbbell was tested in accordance with ASTM D638 at a temperature of 23° C. and a tension rate of 50 mm/min to determine the tensile yield strength and tensile elongation of the test piece.

[Flexural Modulus and Flexural Strength]

A 100 mm×100 mm×2 mm test piece was molded with use of a 50-ton clamping force injection molding apparatus at a cylinder temperature of 245° C. and a mold temperature of 80° C. The test piece was tested in accordance with ASTM D790 at a temperature of 23° C. and a bending rate of 5 mm/min to determine the flexural modulus and flexural strength of the test piece.

[Izod Impact Strength]

A 62.3 mm×12.4 mm×3 mm notched test piece for Izod impact test was molded with use of a 50-ton clamping force injection molding apparatus at a cylinder temperature of 245° C. and a mold temperature of 80° C. The test piece was tested in accordance with ASTM D256 at a temperature of 0° C. and 23° C. to determine the Izod impact strength of the test piece.
[Appearance]
A 100 mm×100 mm×3 mm square plate was molded with use of a 50-ton clamping force injection molding apparatus at a cylinder temperature of 245° C. and a mold temperature of 80° C. The surface condition of the square plate was visually observed.

The square plate was evaluated "absent (smooth)" when the plate was uniform in color and did not catch a nail scratching the surface of the plate. The square plate was evaluated "present" when the plate was nonuniform in color and caught a nail scratching the surface of the plate.

Synthetic Example 1

Metallocene Catalyst (1) Preparation of 1-tert-butyl-3-methylcyclopentadiene

In a nitrogen atmosphere, dried diethyl ether (350 ml) was added to a tert-butylmagnesium chloride/diethyl ether solution (450 ml, 0.90 mol, a 2.0 mol/l solution). A solution of 3-methylcyclopentenone (43.7 g, 0.45 mmol) in dried diethyl ether (150 ml) was added dropwise to the solution while keeping the temperature at 0° C. by ice cooling. The mixture was stirred at room temperature for 15 hours. To the reaction solution, a solution of ammonium chloride (80.0 g, 1.50 mol) in water (350 ml) was added dropwise while keeping the temperature at 0° C. with ice cooling. Water (2500 ml) was added to the resultant solution, and the mixture was stirred. The organic phase was separated and washed with water. Thereafter, a 10% aqueous hydrochloric acid solution (82 ml) was added to the organic phase while the temperature was kept at 0° C. with ice cooling. The mixture was stirred at room temperature for 6 hours. The organic phase of the resultant reaction liquid was separated, then washed with water, a saturated aqueous sodium hydrogen carbonate solution, water and a saturated saline solution, and dried over anhydrous magnesium sulfate. The desiccant was filtered off, and the solvent was distilled away from the filtrate, resulting in a liquid. The liquid was distilled under reduced pressure (45-47° C./10 mm Hg) to give 14.6 g of a light yellow liquid. The analytical data are given below.
$^1$H-NMR (270 MHz, in CDCl$_3$, TMS standard) δ6.31+ 6.13+5.94+5.87 (s+s+t+d, 2H), 3.04+2.95 (s+s, 2H), 2.17+ 2.09 (s+s, 3H), 1.27 (d, 9H).

(2) Preparation of 3-tert-butyl-1,6,6-trimethylfulvene

In a nitrogen atmosphere, dried acetone (55.2 g, 950.4 mmol) was added dropwise to a solution of 1-tert-butyl-3-methylcyclopentadiene (13.0 g, 95.6 mmol) in dried methanol (130 ml), and subsequently pyrrolidine (68.0 g, 956.1 mmol) was added thereto dropwise. During the dropwise addition, the temperature was kept at 0° C. by ice cooling. The mixture was stirred at room temperature for 4 days. The resultant reaction liquid was diluted with diethyl ether (400 ml), and water (400 ml) was added. The organic phase was separated, then washed with a 0.5 N aqueous hydrochloric acid solution (150 ml×4), water (200 ml×3) and a saturated saline solution (150 ml), and dried over anhydrous magnesium sulfate. The desiccant was filtered off, and the solvent was distilled away from the filtrate, resulting in a liquid. The liquid was distilled under reduced pressure (70-80° C./0.1 mm Hg) to give 10.5 g of a yellow liquid. The analytical data are given below.
$^1$H-NMR (270 MHz, in CDCl$_3$, TMS standard) δ6.23 (s, 1H), 6.05 (d, 1H), 2.23 (s, 3H), 2.17 (d, 6H), 1.17 (s, 9H)

(3) Preparation of 2-(3-tert-butyl-5-methyl cyclopentadienyl)-2-fluorenylpropane In a nitrogen atmosphere, a hexane solution of n-butyllithium (40 ml, 61.6 mmol) was added dropwise to a solution of fluorene (10.1 g, 60.8 mmol) in THF (300 ml) with ice cooling. The mixture was stirred at room temperature for 5 hours (resulting in a dark brown solution). The solution was ice cooled again, and a solution of 3-tert-butyl-1,6,6-trimethylfulvene (11.7 g, 66.5 mmol) in THF (300 ml) was added thereto dropwise in a nitrogen atmosphere. The reaction solution was stirred at room temperature for 14 hours. The resultant brown solution was ice cooled, and water (200 ml) was added. The obtained solution was extracted with diethyl ether. Then the organic phase was separated therefrom, and dried over magnesium sulfate. The organic phase was filtered, and the solvent was removed from the filtrate under reduced pressure, resulting in an orange-brown oil. The oil was purified by silica gel column chromatography (developing solvent: hexane) to give 3.8 g of a yellow oil. The analytical data are given below.
$^1$H-NMR (270 MHz, in CDCl$_3$, TMS standard) δ7.70 (d, 4H), 7.34-7.26 (m, 6H), 7.18-7.11 (m, 6H), 6.17 (s, 1H), 6.01 (s, 1H), 4.42 (s, 1H), 4.27 (s, 1H), 3.01 (s, 2H), 2.87 (s, 2H), 2.17 (s, 3H), 1.99 (s, 3H), 2.10 (s, 9H), 1.99 (s, 9H), 1.10 (s, 6H), 1.07 (s, 6H).

(4) Preparation of dimethylmethylene(3-tert-butyl-5-methylcyclopentadienyl)fluorenylzirconium dichloride In a nitrogen atmosphere, a hexane solution of n-butyllithium (5.0 ml, 7.7 mmol) was added dropwise to a solution of 2-(3-tert-butyl-5-methylcyclopentadienyl)-2-fluorenylpropane (1.14 g, 3.3 mmol) in diethyl ether (25 ml) with ice cooling. The mixture was stirred at room temperature for 14 hours to give a pink slurry. Zirconium tetrachloride (0.77 g, 3.3 mmol) was added to the slurry at −78° C. The mixture was stirred at −78° C. for several hours and at room temperature for 65 hours. The resultant dark brown slurry was filtered. The residue was washed with 10 ml of diethyl ether, and was then extracted with dichloromethane to give a red solution. The solvent of the solution was distilled away under reduced pressure to give 0.53 g of red orange solid metallocene catalyst dimethylmethylene(3-tert-butyl-5-methylcyclopentadienyl)fluorenylzirconium dichloride. The analytical data are given below.
$^1$H-NMR (270 MHz, in CDCl$_3$, TMS standard) δ8.11-8.02 (m, 3H), 7.82 (d, 1H), 7.56-7.45 (m, 2H), 7.23-7.17 (m, 2H), 6.08 (d, 1H), 5.72 (d, 1H), 2.59 (s, 3H), 2.41 (s, 3H), 2.30 (s, 3H), 1.08 (s, 9H).

Production Example 1

Preparation of Propylene/1-butene Copolymer (Polymer 1) with Metallocene Catalyst A 2000 ml polymerizer that had been thoroughly purged with nitrogen was charged with 875 ml of dried hexane, 75 g of 1-butene and 1.0 mmol of triisobutylaluminum at normal temperature. The temperature inside the polymerizer was increased to 65° C., and the polymerizer was pressurized to 0.7 MPa with propylene. Subsequently, there was added to the polymerizer a toluene solution in which 0.002 mmol of metallocene catalyst dimethylmethylene (3-tert-butyl-5-methylcyclopentadienyl)fluorenylzirconium dichloride from Synthetic Example 2 and 0.6 mmol in terms of aluminum of methylaluminoxane (manufactured by Tosoh Finechem Corporation) were in contact with each other. Polymerization was carried out for 30 minutes while keeping the internal temperature of the polymerizer at 65° C. and the propylene pressure at 0.7 MPa, and was terminated by the addition of 20 ml of methanol. The polymerizer was depressurized, and the polymer was precipitated by adding the polymerization solution to 2 L of methanol and was dried under vacuum at 130° C. for 12 hours to afford a polymer 1.

The polymer 1 thus obtained weighed 15.2 g. The polymer 1 had a 1-butene content (M) of 27.1 mol %, a melt flow rate (MFR) of 6.5 g/10 min, a molecular weight distribution (Mw/Mn) of 2.11, a melting point (Tm) of 76.2° C. and a heat of fusion ($\Delta H$) of 48 J/g. With M being 27.1 in the equation of Requirement (4): $-2.6M+130 \leq Tm \leq -2.3M+155$, the equation became $59.5 \leq Tm \leq 92.7$. The melting point Tm: 76.2 satisfied this relation.

Production Example 2

Preparation of Propylene/1-butene Copolymer (Polymer 2) with Metallocene Catalyst A 2000 ml polymerizer that had been thoroughly purged with nitrogen was charged with 875 ml of dried hexane, 75 g of 1-butene and 1.0 mmol of triisobutylaluminum at normal temperature. The temperature inside the polymerizer was increased to 60° C., and the polymerizer was pressurized to 0.7 MPa with propylene. Subsequently, there was added to the polymerizer a toluene solution in which 0.002 mmol of metallocene catalyst dimethylmethylene (3-tert-butyl-5-methylcyclopentadienyl)fluorenylzirconium dichloride from Synthetic Example 2 and 0.6 mmol in terms of aluminum of methylaluminoxane (manufactured by Tosoh Finechem Corporation) were in contact with each other. Polymerization was carried out for 30 minutes while keeping the internal temperature of the polymerizer at 65° C. and the propylene pressure at 0.7 MPa, and was terminated by the addition of 20 ml of methanol. The polymerizer was depressurized, and the polymer was precipitated by adding the polymerization solution to 2 L of methanol and was dried under vacuum at 130° C. for 12 hours to afford a polymer 2.

The polymer 2 thus obtained weighed 15.2 g. The polymer 2 had a 1-butene content (M) of 22.4 mol %, a melt flow rate (MFR) of 6.5 g/10 min, a molecular weight distribution (Mw/Mn) of 2.11, a melting point (Tm) of 83.2° C. and a heat of fusion ($\Delta H$) of 51 J/g. With M being 22.4 in the equation of Requirement (4): $-2.6M+130 \leq Tm \leq -2.3M+155$, the equation became $71.8 \leq Tm \leq 103.5$. The melting point Tm: 83.2 satisfied this relation.

Example 1

[Preparation of Modified Propylene Resin (C1)]

The polymer 1: 5 kg obtained by repeating the procedures of Production Example 1, maleic anhydride: 25 g, and PERHEXYN 25B: 12.5 g manufactured by NOF CORPORATION (one-minute half-life temperature: 180° C.) as a reaction initiator were blended together in a Henschel mixer. The blend was melt-kneaded in a 30 mm diameter twin-screw extruder at 230° C. to give a modified propylene resin (C1) composed of the modified propylene/1-butene copolymer (C-2). Table 2 shows MFR, density and maleic acid content of the modified propylene resin (C1).

[Preparation of Resin Composition (1) Containing General-Purpose Engineering Plastic (A1), Propylene Resin (B1) and Modified Propylene Resin (C1)]

In a Henschel mixer, there were blended 2.9 kg of a general-purpose engineering plastic (A1): Amilan CM1017 (polyamide 6, Tm=225° C.) manufactured by TORAY INDUSTRIES, INC., 1.5 kg of a propylene resin (B1): Prime Polypro CJ700 (homopolymer, Tm=160° C.) manufactured by Prime Polymer Co., Ltd., and 0.6 kg of the modified propylene resin (C1). The blend was melt-kneaded in a 30 mm diameter twin-screw extruder to give a resin composition (1) containing the general-purpose engineering plastic (A1), the propylene resin (B1) and the modified propylene resin (C1).

Table 2 shows evaluation results of the tensile yield strength, tensile elongation, flexural strength, flexural modulus, Izod impact strength and appearance of the obtained resin composition (1).

Example 2

[Preparation of Modified Propylene Resin (C2)]

The polymer 1: 4.75 kg obtained by repeating the procedures of Production Example 1, maleic anhydride: 25 g, Prime Polypro F113G (homopolymer, Tm=160° C.): 0.25 kg manufactured by Prime Polymer Co., Ltd. as a polypropylene resin (C-1), and PERHEXYN 25B: 12.5 g manufactured by NOF CORPORATION (one-minute half-life temperature: 180° C.) as a reaction initiator were blended together in a Henschel mixer.

The blend was melt-kneaded in a 30 mm diameter twin-screw extruder at 230° C. to give a modified propylene resin (C2) containing the modified polypropylene (C-1) and the modified propylene/1-butene copolymer (C-2). Table 2 shows MFR, density and maleic acid content of the modified propylene resin (C2).

[Preparation of Resin Composition (2) Containing General-Purpose Engineering Plastic (A1), Propylene Resin (B1) and Modified Propylene Resin (C2)]

In a Henschel mixer, there were blended 2.9 kg of a general-purpose engineering plastic (A1): Amilan CM1017 manufactured by TORAY INDUSTRIES, INC., 1.5 kg of a propylene resin (B1): Prime Polypro CJ700 manufactured by Prime Polymer Co., Ltd., and 0.6 kg of the modified propylene resin (C2). The blend was melt-kneaded in a 30 mm diameter twin-screw extruder to give a resin composition (2) containing the general-purpose engineering plastic (A1), the propylene resin (B1) and the modified propylene resin (C2).

Table 2 shows evaluation results of the tensile yield strength, tensile elongation, flexural strength, flexural modulus, Izod impact strength and appearance of the resin composition (2).

Example 3

[Preparation of Modified Propylene Resin (C3)]

The procedures of Example 2 were repeated, except that the polymer 2 obtained by repeating the procedures in Production Example 2 was used and that the amounts of the components were changed as shown in Table 2, thereby producing a modified propylene resin (C3) containing the modified polypropylene (C-1) and the modified propylene/1-butene copolymer (C-2). Table 2 shows MFR, density and maleic acid content of the modified propylene resin (C3).

[Preparation of Resin Composition (3) Containing General-Purpose Engineering Plastic (A1), Propylene Resin (B1) and Modified Propylene Resin (C3)]

The procedures of Example 2 were repeated, except that the modified propylene resin (C2) was changed to the modified propylene resin (C3) and that the quantitative ratio of the general-purpose engineering plastic (A1), the propylene resin (B1) and the modified propylene resin (C3) was altered as indicated in Table 2, thereby producing a resin composition (3) containing the general-purpose engineering plastic (A1), the propylene resin (B1) and the modified propylene resin (C3).

Table 2 shows evaluation results of the tensile yield strength, tensile elongation, flexural strength, flexural modulus, Izod impact strength and appearance of the resin composition (3).

Examples 4 to 12

[Preparation of Modified Propylene Resins (C4) to (C12)]

The procedures of Example 2 were repeated, except that the amounts of the components were changed as shown in Table or 3, thereby producing modified propylene resins (C4) to (C12) containing the modified polypropylene (C-1) and the modified propylene/1-butene copolymer (C-2). Tables 2 and 3 show MFR, densities and maleic acid contents of the modified propylene resins (C4) to (C12).

[Preparation of Resin Compositions (4) to (12) Containing General-Purpose Engineering Plastic (A1), Propylene Resin (B1) and Modified Propylene Resins (C4) to (C12)]

The procedures of Example 2 were repeated, except that the modified propylene resin (C2) was changed to any of the modified propylene resins (C4) to (C12) and that the quantitative ratio of the general-purpose engineering plastic (A1), the propylene resin (B1) and the modified propylene resin (C4) to (C12) was altered as indicated in Table 3, thereby producing resin compositions (4) to (12) containing the general-purpose engineering plastic (A1), the propylene resin (B1) and the modified propylene resins (C4) to (C12).

Table 3 shows evaluation results of the tensile yield strengths, tensile elongations, flexural strengths, flexural moduli, Izod impact strengths and appearance of the resin compositions (4) to (12).

Comparative Example 1

The procedures of Example 2 were repeated, except that the amounts of the components were changed as shown in Table 3, thereby producing a modified propylene resin (C13) containing the modified polypropylene (C-1) and the modified propylene/1-butene copolymer (C-2).

Table 3 shows MFR, density and maleic acid content of the modified propylene resin (C13).

Further, a resin composition (13) containing the general-purpose engineering plastic (A1), the propylene resin (B1) and the modified propylene resin (C13) was produced in the same manner as in Example 2, except that the modified propylene resin (C2) was changed to the modified propylene resin (C13).

Table 3 shows evaluation results of the tensile yield strength, tensile elongation, flexural strength, flexural modulus, Izod impact strength and appearance of the resin composition (13).

Comparative Example 2

A modified propylene resin (C14) was produced in the same manner as in Example 1, except that the polymer 1 from Production Example 1 was changed to 5 kg of polypropylene resin Prime Polypro F113G manufactured by Prime Polymer Co., Ltd. Table 3 shows MFR, density and maleic acid content of the modified propylene resin (C14).

Further, a resin composition (14) containing the general-purpose engineering plastic (A1), the propylene resin (B1) and the modified propylene resin (C14) was produced in the same manner as in Example 1, except that the modified propylene resin (C14) was used.

Table 3 shows evaluation results of the tensile yield strength, tensile elongation, flexural strength, flexural modulus, Izod impact strength and appearance of the resin composition (14).

Comparative Example 3

In a Henschel mixer, there were blended 3.5 kg of a general-purpose engineering plastic (A1): Amilan CM1017 manufactured by TORAY INDUSTRIES, INC., and 1.5 kg of a propylene resin (B1): Prime Polypro CJ700 manufactured by Prime Polymer Co., Ltd. The blend was melt-kneaded in a 30 mm diameter twin-screw extruder to give a resin composition (15) containing the general-purpose engineering plastic (A1) and the propylene resin (B1). Table 3 shows evaluation results of the tensile yield strength, tensile elongation, flexural strength, flexural modulus, Izod impact strength and appearance of the resin composition (15).

Comparative Example 4

A modified ethylene/1-butene copolymer was produced in the same manner as in Example 1, except that the polymer 1 from Production Example 1 was changed to ethylene/1-butene copolymer (TAFMER A-4090 manufactured by Mitsui Chemicals, Inc.) (MFR (190° C., 2.16 kg)=3.6 g/10 min, density=890 kg/m$^3$, Tm=77° C.). Table 3 shows MFR, density and maleic acid content of the modified ethylene/1-butene copolymer.

Further, a resin composition (16) containing the general-purpose engineering plastic (A1), the propylene resin (B1) and the modified ethylene/1-butene copolymer was produced in the same manner as in Example 1, except that the modified propylene resin (C1) was changed to the modified ethylene/1-butene copolymer.

Table 3 shows the tensile yield strength, tensile elongation, flexural strength, flexural modulus, Izod impact strength and appearance evaluation result of the resin composition (16).

TABLE 2

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| 1. Composition of resin to be modified prior to modification | wt % | PP*[1] |  | 5 | 4 | 5 | 10 | 20 | 30 | 20 |
|  | wt % | EBR*[2] |  |  |  |  |  |  |  |  |
|  | wt % | Polymer 1 | 100 | 95 |  | 95 | 90 | 80 | 70 | 80 |
|  | wt % | Polymer 2 |  |  | 96 |  |  |  |  |  |
| Amount of maleic anhydride added | wt % | Maleic anhydride | 0.5 | 0.5 | 0.5 | 0.8 | 0.5 | 0.5 | 0.5 | 0.5 |

TABLE 2-continued

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Amount of initiator added | wt % | Peroxide | 0.25 | 0.25 | 0.25 | 0.4 | 0.25 | 0.25 | 0.25 | 0.25 |
| 2. Properties of maleic acid-modified resin |  |  |  |  |  |  |  |  |  |  |
| MFR (2.16 kg, 230° C.) | g/10 min |  | 77 | 92 | 97 | 175 | 110 | 110 | 109 | 66 |
| Density | kg/m$^3$ |  | 881 | 885 | 888 | 886 | 885 | 888 | 890 | 887 |
| Maleic acid modification amount | wt % |  | 0.24 | 0.36 | 0.33 | 0.52 | 0.32 | 0.34 | 0.25 | 0.42 |
| 3. PA6/PP/MAH grafted resin blend ratio |  |  |  |  |  |  |  |  |  |  |
| (A) Polyamide 6*$^3$ | wt % |  | 58 | 58 | 58 | 58 | 58 | 58 | 58 | 50 |
| (B) Polypropylene resin*$^4$ | wt % |  | 30 | 30 | 30 | 30 | 30 | 30 | 30 | 30 |
| Modified resin | wt % |  | 12 | 12 | 12 | 12 | 12 | 12 | 12 | 20 |
| 4. Properties of PA6/PP/MAH grafted resin blend |  |  |  |  |  |  |  |  |  |  |
| Tensile yield strength | MPa |  | 55 | 56 | 58 | 56 | 56 | 57 | 58 | 47 |
| Tensile elongation | % |  | 51 | 49 | 38 | 51 | 45 | 40 | 37 | 37 |
| Flexural strength | MPa |  | 81 | 83 | 84 | 81 | 84 | 86 | 87 | 64 |
| Flexural modulus | MPa |  | 2065 | 2129 | 2216 | 2123 | 2152 | 2211 | 2237 | 1763 |
| 23° C. Izod impact strength | J/m |  | 97 | 99 | 80 | 81 | 89 | 77 | 76 | 105 |
| 0° C. Izod impact strength | J/m |  | 75 | 68 | 60 | 62 | 67 | 58 | 58 | 62 |
| Appearance defects on injection molded square plate*$^5$ | — |  | Absent (smooth) | Absent (smooth) | Absent (smooth) | Absent (smooth) | Absent (smooth) | Absent (smooth) | Absent (smooth) | Absent (smooth) |

*$^1$Prime Polypro F113G manufactured by Prime Polymer Co., Ltd.
*$^2$TAFMER A-4090 manufactured by Mitsui Chemicals, Inc.
*$^3$Amilan CM1017 manufactured by TORAY INDUSTRIES, INC.
*$^4$Prime Polypro CJ700 manufactured by Prime Polymer Co., Ltd.
*$^5$A 3 mm thick square plate was injection molded and the appearance of the square plate was visually observed.

TABLE 3

|  |  |  | Ex. 9 | Ex. 10 | Ex. 11 | Ex. 12 | Comp. Ex. 1 | Comp. Ex. 2 | Comp. Ex. 3 | Comp. Ex. 4 |
|---|---|---|---|---|---|---|---|---|---|---|
| 1. Composition of resin to be modified prior to modification | wt % | PP*$^1$ | 20 | 20 | 20 | 20 | 50 | 100 | — |  |
|  | wt % | EBR*$^2$ |  |  |  |  |  |  | — | 100 |
|  | wt % | Polymer 1 | 80 | 80 | 80 | 80 | 50 |  |  |  |
|  | wt % | Polymer 2 |  |  |  |  |  |  |  |  |
| Amount of maleic anhydride added | wt % | Maleic anhydride | 0.5 | 0.5 | 0.5 | 1 | 0.5 | 0.5 | — | 0.5 |
| Amount of initiator added | wt % | Peroxide | 0.25 | 0.25 | 0.25 | 0.5 | 0.25 | 0.25 | — | 0.25 |
| 2. Properties of maleic acid-modified resin |  |  |  |  |  |  |  |  |  |  |
| MFR (2.16 kg, 230° C.) | g/10 min |  | 66 | 66 | 66 | 600 | 115 | 165 | — | 4 |
| Density | kg/m$^3$ |  | 887 | 887 | 887 | 898 | 895 | 898 | — | 890 |
| Maleic acid modification amount | wt % |  | 0.42 | 0.42 | 0.42 | 0.8 | 0.38 | 0.42 | — | 0.45 |
| 3. PA6/PP/MAH grafted resin blend ratio |  |  |  |  |  |  |  |  |  |  |
| (A) Polyamide 6*$^3$ | wt % |  | 40 | 48 | 55 | 58 | 58 | 58 | 70 | 58 |
| (B) Polypropylene resin*$^4$ | wt % |  | 40 | 40 | 40 | 30 | 30 | 30 | 30 | 30 |
| Modified resin | wt % |  | 20 | 12 | 5 | 12 | 12 | 12 | 0 | 12 |
| 4. Properties of PA6/PP/MAH grafted resin blend |  |  |  |  |  |  |  |  |  |  |
| Tensile yield strength | MPa |  | 32 | 50 | 57 | 58 | 60 | 64 | 61 | 61 |
| Tensile elongation | % |  | 199 | 38 | 22 | 35 | 25 | 16 | 4 | 6 |
| Flexural strength | MPa |  | 48 | 71 | 83 | 81 | 89 | 96 | 89 | 80 |
| Flexural modulus | MPa |  | 1595 | 1979 | 2303 | 2125 | 2336 | 2611 | 2586 | 2421 |
| 23° C. Izod impact strength | J/m |  | 116 | 77 | 56 | 70 | 76 | 66 | 35 | 39 |
| 0° C. Izod impact strength | J/m |  | 25 | 59 | 49 | 55 | 55 | 39 | 36 | 39 |
| Appearance defects on injection molded square plate*$^5$ | — |  | Absent (smooth) | Absent (smooth) | Absent (smooth) | Absent (smooth) | Present | Present | Present | Present |

*$^1$Prime Polypro F113G manufactured by Prime Polymer Co., Ltd.
*$^2$TAFMER A-4090 manufactured by Mitsui Chemicals, Inc.
*$^3$Amilan CM1017 manufactured by TORAY INDUSTRIES, INC.
*$^4$Prime Polypro CJ700 manufactured by Prime Polymer Co., Ltd.
*$^5$A 3 mm thick square plate was injection molded and the appearance of the square plate was visually observed.

The invention claimed is:

1. A resin composition comprising 20 to 80 wt % of a general-purpose engineering plastic (A), 10 to 50 wt % of a polypropylene resin (B) and 1 to 30 wt % of a modified propylene resin (C) (wherein the total of (A), (B) and (C) is 100 wt %), the modified propylene resin (C) being obtained by modifying a resin composition (C-3) which comprises 5 to 30 wt % of a polypropylene (C-1) having a melting point (Tm) of not less than 120° C. as measured by differential scanning calorimetry (DSC), and 70 to 95 wt % of a propylene/1-butene copolymer (C-2) having a propylene content of 72.9 to 95 mol % and a melting point (Tm) of less than 120° C. as measured by DSC or not showing a melting point peak in DSC (wherein the total of (C-1) and (C-2) is 100 wt %).

2. The resin composition according to claim 1, wherein the general-purpose engineering plastic (A) is at least one selected from the group consisting of polyamides, polyethylene terephthalates and polybutylene terephthalates.

3. The resin composition according to claim 1, wherein the polypropylene resin (B) is a propylene homopolymer or a propylene/C2 or C4-10 α-olefin copolymer and has a melting point (Tm) of not less than 120° C. as measured by differential scanning calorimetry (DSC).

4. The resin composition according to claim 1, wherein the propylene/1-butene copolymer (C-2) has a heat of fusion ΔH of over 40 J/g.

5. The resin composition according to claim 1, wherein the propylene/1-butene copolymer:

(2) has a molecular weight distribution (Mw/Mn) of not more than 3.0 as measured by gel permeation chromatography (GPC); and (3) has a melting point (Tm) of not more than 110° C. as measured by differential scanning calorimetry (DSC) or does not show a melting point peak in DSC.

6. The resin composition according to claim 5, wherein the propylene/1-butene copolymer satisfies:

$$-2.6M+130 \leq TM \leq -2.3M+155 \quad (4)$$

wherein Tm is the melting point (° C.) as measured by differential scanning calorimetry (DSC) and M is the content (mol %) of structural units derived from 1-butene.

7. The resin composition according to claim 1, wherein the modified propylene resin (C) is obtained by graft modifying the resin composition (C-3) with an unsaturated carboxylic acid or a derivative thereof.

8. A molded article manufactured by molding the resin composition according to claim 1.

9. The molded article according to claim 8, which is an automobile part or a home electrical appliance part.

10. A method comprising: mixing 1 to 30 wt % of a modified propylene resin (C) is used as a compatibilizer of 20 to 80 wt % of a general-purpose engineering plastic (A) and 10 to 50 wt % of a polypropylene resin (B) (wherein the total of (A), (B) and (C) is 100 wt %), the modified propylene resin (C) being obtained by modifying a resin composition (C-3) which comprises 5 to 30 wt % of a polypropylene (C-1) having a melting point (Tm) of not less than 120° C. as measured by differential scanning calorimetry (DSC), and 70 to 95 wt % of a propylene/1-butene copolymer (C-2) having a propylene content of 72.9 to 95 mol % and a melting point (Tm) of less than 120° C. as measured by DSC or not showing a melting point peak in DSC (wherein the total of (C-1) and (C-2) is 100 wt %).

* * * * *